United States Patent [19]
Lee et al.

[11] Patent Number: 5,909,749
[45] Date of Patent: Jun. 8, 1999

[54] VALVE APPARATUS OF HERMETIC TYPE COMPRESSOR

[75] Inventors: Un Seop Lee; Jae Seog Oh; Kyoung Sig Tark, all of Kyungsangnam-Do; Won Sik Oh, Seoul; Hyeong Seok Kim, Kyungki-Do; Sang Min Lee, Kyungsangnam-Do, all of Rep. of Korea

[73] Assignee: LG Electronics, Inc., Rep. of Korea

[21] Appl. No.: 08/814,087

[22] Filed: Mar. 10, 1997

Related U.S. Application Data

[62] Division of application No. 08/619,405, Mar. 21, 1996.

[51] Int. Cl.[6] .................................................. F16K 15/16
[52] U.S. Cl. ............................ 137/857; 137/856; 417/569
[58] Field of Search ............................. 137/856, 857; 417/565, 569, 571

[56] References Cited

U.S. PATENT DOCUMENTS

| | | | |
|---|---|---|---|
| 1,375,252 | 4/1921 | Huff | 137/856 |
| 2,821,429 | 1/1958 | Rantala | 137/856 |
| 2,996,155 | 8/1961 | Priesemuth | 137/857 |
| 3,939,867 | 2/1976 | Lundvik | 137/856 |
| 4,723,896 | 2/1988 | Fritchman | 137/857 |
| 5,209,260 | 5/1993 | Baek | 137/857 |
| 5,232,354 | 8/1993 | Clement | 417/569 |
| 5,328,338 | 7/1994 | Hirano | 417/565 |
| 5,558,508 | 9/1996 | Sasano | 137/857 |

*Primary Examiner*—John Rivell
*Assistant Examiner*—Ramyar Farid
*Attorney, Agent, or Firm*—Ostrolenk, Faber, Gerb & Soffen, LLP

[57] ABSTRACT

A valve apparatus of a hermetic type compressor enables an easy mounting of an exhaust valve and a valve spring to an accurate position within a reentrant groove formed in a cylinder head, decreases the number of elements of the valve apparatus to facilitate the assembly and reduces a dead volume to enhance efficiency of the compressor. The valve apparatus includes a cylinder head having a reentrant groove with an exhaust hole, the exhaust valve installed to be opened/closed on the upper surface of the exhaust hole, the valve spring in contact with an upper surface of the exhaust valve, a head cover and a packing interposing between the cylinder head and head cover for preventing a leakage of the refrigerant gas.

1 Claim, 10 Drawing Sheets

VALVE APPARATUS OF HERMETIC TYPE COMPRESSOR

This is a Division of application Serial No. 08/619,405, filed Mar. 21, 1996.

BACKGROUND OF THE INVENTION

1. Field of the Invention

The present invention relates to a valve apparatus of a hermetic type compressor, and more particularly to a valve apparatus of a hermetic type compressor capable of easily mounting an exhaust value and a valve spring to an interior of a reentrant groove formed in a cylinder head and reducing the number of elements constituting the valve apparatus to facilitate an the assembly while improving the performance thereof.

2. Description of the Prior Art

When operating a general compressor, a rotor is primarily rotated by the electro-magnetic action of a stator and the rotor upon being supplied with electrical power, and a crank shaft is caused to revolve by the rotation of the rotor.

Then, the vertical rotation force of the crank shaft is converted into a horizontal motion by a connecting rod or slider to horizontally move a piston. Finally, the piston reciprocates within a cylinder.

At this time, while the piston retracts, refrigerant is introduced into the cylinder via a suction inlet and a suction valve of a cylinder head. The refrigerant introduced as above is compressed by the forward movement of the piston to pass through an exhaust hole of the cylinder head, thereby being discharged while opening an exhaust valve.

In designing the conventional valve apparatus of the general hermetic type compressor operated as above, it has been a significant concern for improving efficiency of the compressor to decrease the volume formed within the cylinder and the sum of the internal volume (hereinafter referred to as "dead volume") of the exhaust hole (of which detailed description will be given later) interlocked with the cylinder when the piston linearly reciprocating within the cylinder reaches a top dead center.

This is because the refrigerant gas of high pressure which is left in the dead volume during the discharge process of the compressed gas inflates during the retraction of the piston during the suction stroke of the cylinder to disturb the intake of the refrigerant gas via the suction inlet, so that the efficiency of the compressor is degraded.

The above-mentioned exhaust hole which is formed in the cylinder head communicates with the internal space of the cylinder until the exhaust hole is cut off by the exhaust valve.

The valve apparatus provided between the cylinder and the head cover utilized in the conventional hermetic type compressor relating as above is provided for the intake/discharge of the refrigerant gas into/from the cylinder. Here, the suction valve, cylinder head, packing and exhaust valve are separately formed in a plate type to be sequentially assembled as the valve apparatus; otherwise, a reentrant groove is formed in the cylinder head out of the above elements to install the exhaust valve, etc.

In connection with the description of conventional examples of the valve apparatus having the foregoing two types of the hermetic type compressor, the example of installing the exhaust valve by forming the reentrant groove in the cylinder head will be described with reference to well-known U.S. patents.

Figure 1:
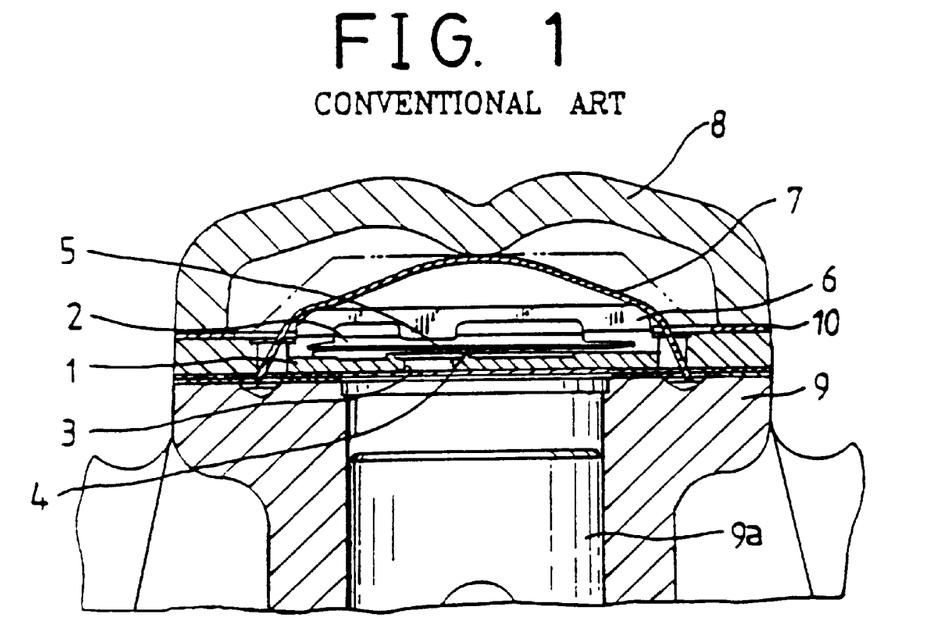
FIG. 1 is a sectional view showing a construction of a conventional valve apparatus of a hermetic type compressor disclosed in U.S. Pat. No. 4,723,896.

As shown in FIG. 1, a valve apparatus of a hermetic type compressor in accordance with U.S. Pat. No. 4,723,896 (hereinafter referred to as a "cited art no. 1") is provided with a reentrant groove 2 in a cylinder head 1 for seating the exhaust valve apparatus.

An exhaust hole 3 is formed to the reentrant groove 2, and an exhaust valve 4 is installed to the upper portion of exhaust hole 3 for closing exhaust hole 3.

A valve spring 5 is installed to the upper side of exhaust valve 4 for repositioning exhaust valve 4 from an open state to the closed state.

The valve spring 5 is joined with a retainer 6 fixed within reentrant groove 2 of cylinder head 1. Also, the above-stated elements are fixed by a clamp 7 installed to the upper side of retainer 6.

The above elements are placed between a head cover 8 and a cylinder 9, and a packing 10 is tightly provided between head cover 8 and cylinder head 1 for preventing a leakage of the refrigerant of high temperature and high pressure.

Undefined reference numeral 9a denotes a piston.

However, the valve apparatus of the hermetic type compressor according to the cited art no. 1 includes a plurality of elements such as exhaust valve 4, valve spring 5 and retainer 6 for fixing these. Consequently, a plurality of elements are required for constituting the valve apparatus, and the slits for insertedly receiving the clamp should be formed in cylinder head 1 to complicate the structure and impede workability.

Furthermore, since valve spring 5 is fixed by using retainer 6, the shape of valve spring 5 is distorted by exhaust valve 4 to deform retainer 6 when distorted valve spring 5 contacts retainer 6. Therefore, respective elements are not properly operated.

Figure 2:
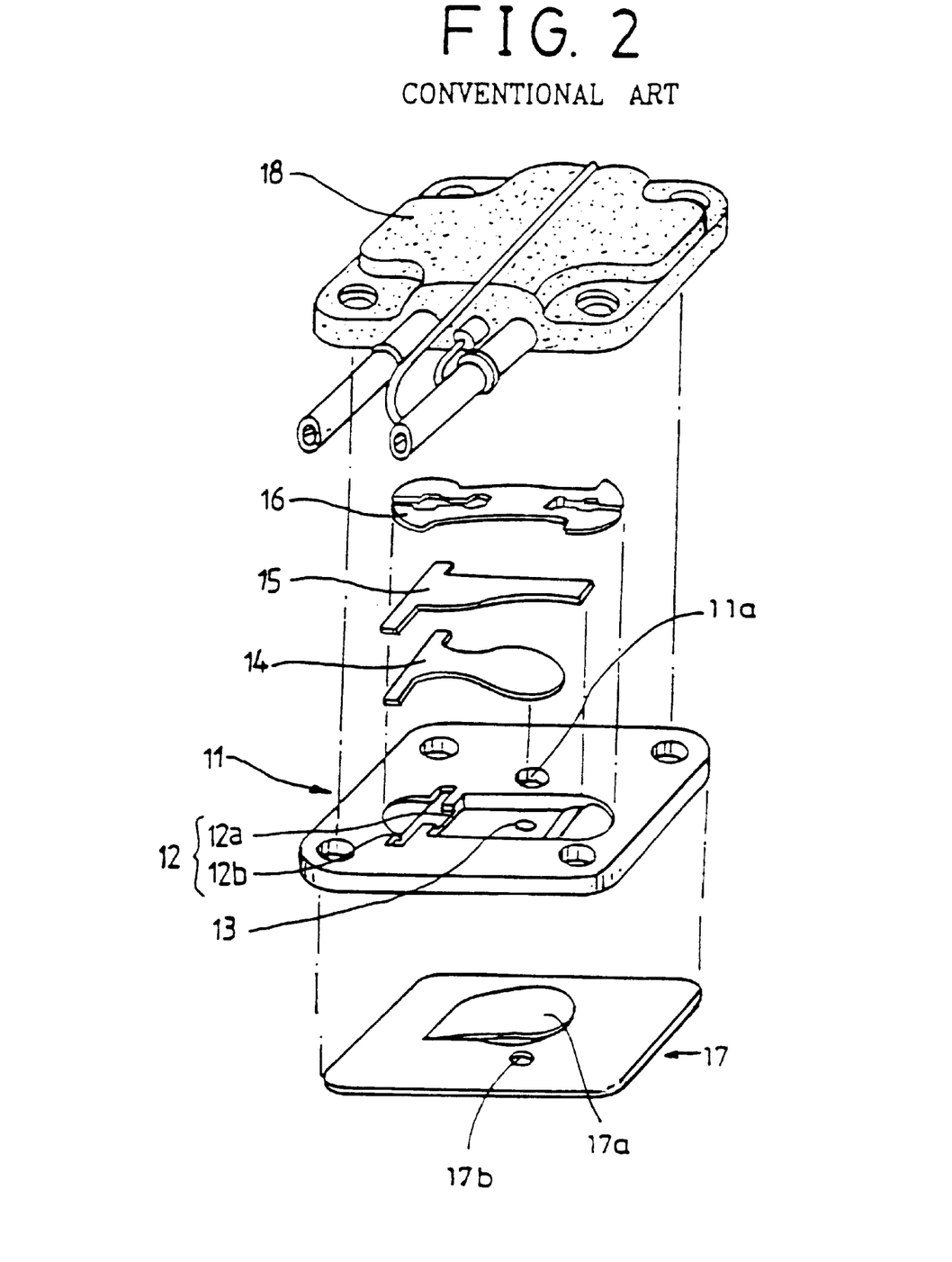
FIG. 2 is an exploded perspective view showing a construction of a conventional valve apparatus of a hermetic type compressor disclosed in U.S. Pat. No. 5,209,260.

Meantime, as shown in FIG. 2, a valve apparatus of a hermetic type compressor in accordance with U.S. Pat. No. 5,209,260 (hereinafter referred to as a "cited art no. 2") includes a suction valve plate 17, a cylinder head 11, an exhaust valve 14, a valve spring 15, a retainer 16 and a head cover 18, which are sequentially coupled to a cylinder (not shown).

Now, shapes of the above-mentioned elements will be described in more detail.

A suction valve 17a and an eject hole 17b are formed around the center of suction valve plate 17.

A reentrant groove 12 formed with a stepped first receiving portion 12a and second receiving portion 12b is formed in one central side of cylinder head 11.

First receiving portion 12a is shaped to be deeper than second receiving portion 12b, and an exhaust hole 13 is formed in the center of first receiving portion 12a.

Then, the exhaust valve 14 and the valve spring 15 are successively seated to one inside of the first receiving portion 12a. Thus, the exhaust valve 14 opens/closes the exhaust hole 13 and valve spring 15 defines the opening/closing range of the exhaust valve 14.

A suction hole 11a which is opened and closed by suction valve 17a of suction valve plate 17 is formed to one outside of the reentrant groove 12.

The retainer 16 is fixedly installed to the second receiving portion 12b shallower than the first receiving portion 12a within the reentrant groove 12 of cylinder head 11 to be disposed to the upper side of the exhaust valve 14 and the valve spring 15, which are sequentially stacked within the reentrant groove 12 in advance.

At this time, the retainer 16 embedded into second receiving portion 12b is so firmly fixed to cylinder head 11 to exclude clamp referred in the above cited art no. 1.

Undefined reference numeral 18 denotes a head cover.

However, the valve apparatus of the hermetic type compressor according to the prior art disclosed in U.S. Pat. No. 5,209,260 has a drawback such that the elements installed within the stepped reentrant groove 12 of cylinder head 11 are small in size but many in number which complicates the assembling operation.

In addition, since the shape of the center of retainer 16 fixed to cylinder head 11 is upwardly deformed by valve spring 15 when the valve apparatus is operated, valve spring 15 is stopped under the state of deviating a prescribed position. As a result, the opening/closing time of exhaust valve 14 cannot be suitably adjusted to cause a backward flowing and great re-expansion loss of the compressed refrigerant, so that the efficiency of the compressor is lowered.

Figure 3:
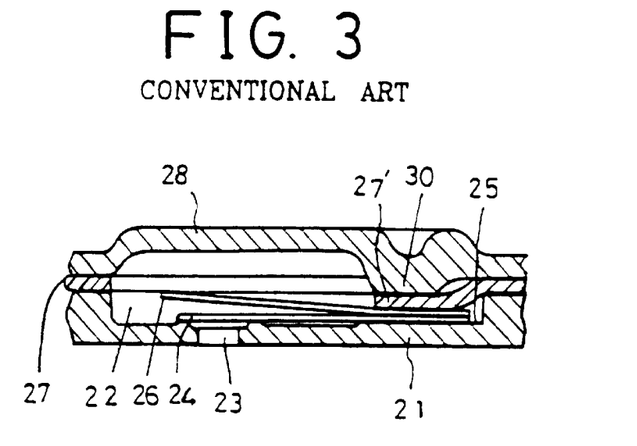
FIG. 3 is a sectional view showing a construction of a conventional valve apparatus of a hermetic type compressor disclosed in U.S. Pat. No. 5,328,338.

Referring to FIG. 3, a valve apparatus of a hermetic type compressor in accordance with U.S. Pat. No. 5,328,338 (hereinafter referred to as a "cited art No. 3") is formed with a reentrant groove 22 of a predetermined shape in a cylinder head 21 and an exhaust hole 23 within the reentrant groove 22.

A valve installing plane 25 for seating one end of an exhaust valve 24 for opening/closing the exhaust hole 23 is formed to the inside of the cylinder head 21.

A valve spring 26 having an upward inclination for defining the opening/closing range of exhaust valve 24 is provided to the upper side of a exhaust valve 24.

An extension portion 27' of a packing 27 disposed between cylinder head 21 and a head cover 28 is formed to the upper portion of the exhaust valve 24 and valve spring 26, which are sequentially placed within the reentrant groove 22.

An inward projection 30 is formed from an inner side of the head cover 28 toward the upper side of extension portion 27' of packing 27. By this structure, the exhaust valve 24 and one end of the valve spring 26 are fixed in the manner that extension portion 27' of packing 27 is pressed when head cover 28 is assembled with cylinder head 21.

More specifically, in order to fix the exhaust valve 24 and the valve spring 26 for maintaining them in the normal position, extension portion 27' of packing 27 is placed on the exhaust valve 24 and one end of the valve spring 26, i.e., on the end in opposition to a portion of the exhaust valve 24 which covers the exhaust hole 23, to be passively fixed by inward projection 30 formed to the head cover 28.

The cited art no. 3 has a construction that just exhaust valve 24 and valve spring 26 are installed to the reentrant groove 22 formed in cylinder head 21 without installing a retainer. Here, inward projection 30 is formed to head cover 28 to fix valve spring 25.

In the compressor according to the cited art no. 3 constructed as above, the number of elements installed within the reentrant groove 22 is decreased as compared with those of the cited art no. 1, but inward projection 30 is formed to head cover 28 instead for decreasing the elements installed within the reentrant groove 22 to passively fix exhaust valve 24 and valve spring 26.

For this structure, when the valve apparatus is assembled, it is not easy to perform the assembling operation for installing exhaust valve 24 and valve spring 26 within the reentrant groove 22 which is then joined with cylinder head 21 by interposing extension portion 27' of packing 27 to inward portion 30 of head cover 28 to the upper portion of exhaust valve 24 and valve spring 26. Moreover, inward projection 30 must be precisely shaped to accurately assemble head cover 28.

In addition to these, the retainer for defining the ascension of valve spring 26 is not provided to obstruct an efficient fixing of valve spring 26, and the ascension of valve spring 26 is not defined to be unable to restrict the ascending range of valve spring 26, thereby imposing too much stress to the fixing end which fixes valve spring 26.

Consequently, packing 27 pressed by head cover 28 and applied by a force resulting from the repeated ascension of valve spring 26 is easily damaged to make valve spring 26 and exhaust valve 24 not be fixed onto the normal position.

Figure 4:
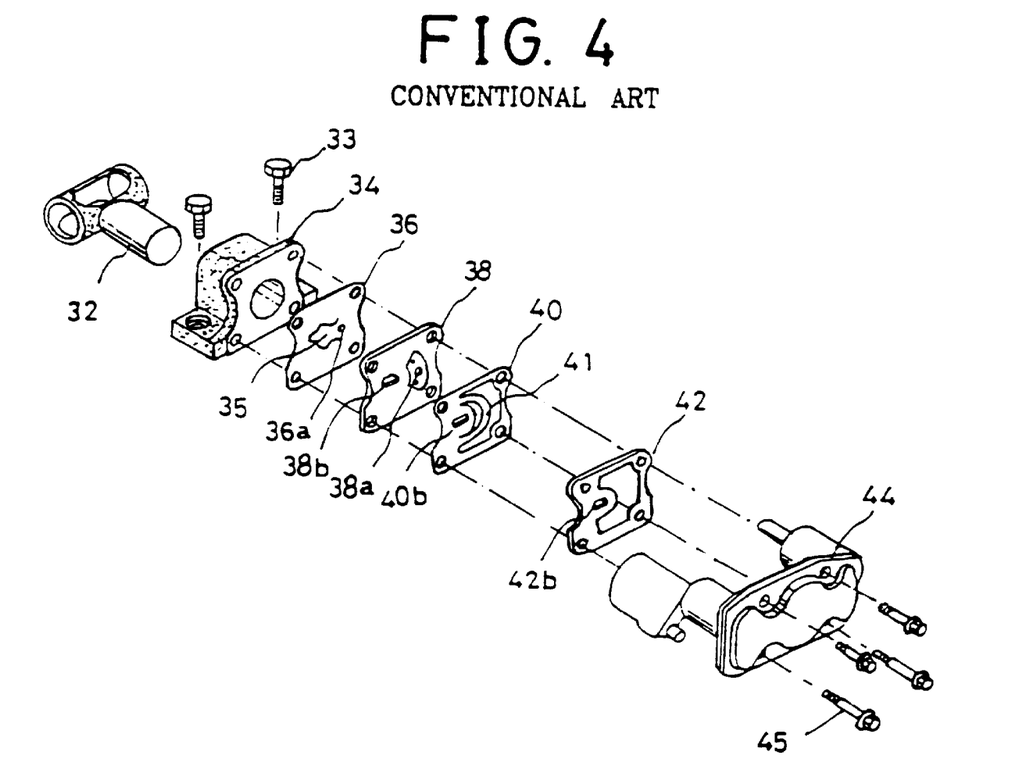
FIG. 4 is an exploded perspective view showing a construction of a conventional valve apparatus of a hermetic type compressor according to another technique.

In FIG. 4, another example (hereinafter referred to as a "cited art no. 4") of a valve apparatus of a hermetic type compressor is formed by sequentially assembling a suction valve, a cylinder head, a packing and an exhaust valve, which are shaped as separately-provided plates. Here, a suction valve plate 36, cylinder head 38, an eject valve plate 40, packing 42 and a head cover 44 are successively assembled to be coupled by means of screws 45.

A suction valve 35 of a predetermined shape and an eject hole 36a are formed to suction valve plate 36.

A suction hole 38b and an exhaust hole 38a are respectively formed in cylinder head 38, and a suction hole 40b and an eject valve 41 of a predetermined shape are formed into eject valve plate 40.

Packing 42 is assembled to be interposed where the eject valve plate 40 becomes in contact with head cover 44, thereby preventing a leakage of the compressed gas.

At this time, eject hole 36a in suction valve plate 36 is formed to be opposite to exhaust hole 38a in cylinder head 38 to be communicated with each other.

Also, suction hole 38b of cylinder head 38, suction hole 40b of eject valve plate 40 and suction hole 42b of packing 42 are formed to be opposite to be communicated with one another.

Undefined reference numeral 32 denotes a piston, and reference numeral 33 screws for mounting a cylinder 34.

However, in the valve apparatus of the hermetic type compressor according to the cited art no. 4 described as above, eject hole 36a and exhaust hole 38a formed in suction valve plate 36 and cylinder head 38, which form the valve apparatus in one side of cylinder 34, are bulky which increases the dead volume. Thus, the efficiency of the compressor is degraded.

SUMMARY OF THE INVENTION

Therefore, it is an object of the present invention to provide a valve apparatus of a hermetic type compressor for decreasing dead volume.

It is another object of the present invention to provide a valve apparatus of a hermetic type compressor for simplifying elements of the valve apparatus, which are installed within a reentrant groove formed in a cylinder head.

It is still another object of the present invention to provide a valve apparatus of a hermetic type compressor capable of facilitating the assembly of an exhaust valve and a valve spring installed within a reentrant groove formed in a cylinder head, and precisely fixing the exhaust valve and valve spring without being deviated from a normal position during the operation of the valve apparatus.

It is yet another object of the present invention to provide a valve apparatus of a hermetic type compressor for simplifying a structure of the valve apparatus installed within a reentrant groove formed in a cylinder head to enhance working productivity and economizing manufacturing cost.

To achieve the above object of the present invention, there is provided a valve apparatus of a hermetic type compressor including a cylinder head which is provided with a reentrant groove having an exhaust hole for ejecting a compressed refrigerant from an interior of a cylinder and a seating portion, and an exhaust valve of which one end is fixed to the seating portion of the reentrant groove and the other end is installed to an upper surface of the exhaust hole capable of being opened/closed. In addition, a valve spring has one end fixed to an upper surface of the one end of the exhaust valve and the other end for defining an operation of the exhaust valve, and a head cover is integrally formed with a supporting projection protruding from a bottom surface in contact with the other end of the valve spring. Also, a packing is placed between the cylinder head and head cover and having one side for preventing a leakage of the refrigerant gas.

To achieve another object of the present invention, a valve apparatus of a hermetic type compressor includes a cylinder head provided with a reentrant groove which has an exhaust hole for ejecting a compressed refrigerant from an interior of a cylinder, a fixing groove part including a leg seating portion and a fixing-pin settling portion and a seating portion, respectively. An exhaust valve is installed to an upper surface of the exhaust hole to be capable of being opened/closed and has legs at one end in the opposing direction to each other, and the other end thereof is installed to the upper surface of the exhaust hole capable of being opened/closed. Also, a fixing pin has a fixing-pin body and fixing arms formed at both ends of the fixing-pin body and a head cover is provided. A packing interposing between the cylinder head and head cover prevents a leakage of the refrigerant gas.

To achieve still another object of the present invention, a valve apparatus of a hermetic type compressor includes a cylinder head provided with a reentrant groove which has an exhaust hole for ejecting a compressed refrigerant from an interior of a cylinder, a fixing groove in one side and a seating portion. An exhaust valve has a valve fixing plate for being seated to the seating portion at one end thereof, and a valve spring in contact with an upper surface of the exhaust valve is formed with a spring fixing plate on the straight upper portion of the valve fixing plate. In addition to these, a fixing member has a depressed compressive portion in contact with an upper surface of the spring fixing plate for pressing to fix the valve spring and elastic portions bent from both sides of the compressive portion to be inserted to the fixing groove, and a head cover tightly presses the elastic portion of the fixing member by the coupling with the cylinder head. A packing interposing between the cylinder head and head cover prevents a leakage of the refrigerant gas.

To achieve yet another object of the present invention, a valve apparatus of a hermetic type compressor includes a cylinder head provided with a reentrant groove which has an exhaust hole for ejecting a compressed refrigerant from an interior of a cylinder, a first seating portion for securing a valve spring and a second seating portion having a height identical to the exhaust hole. An exhaust valve is installed to an upper surface of the exhaust hole to be capable of being opened/closed, and the valve spring is in contact with an upper surface of the exhaust valve and has one end provided with a wing portion seated to the first seating portion of the reentrant groove at both sides thereof. A head cover is coupled with the cylinder head from the upper side of the valve spring for fixing the valve spring, and a packing interposing between the cylinder head and head cover prevents a leakage of the refrigerant gas.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Hereinafter, a valve apparatus of a hermetic type compressor according to the present invention will be described in detail with reference to embodiments illustrated in the accompanying drawings.

Figure 5:
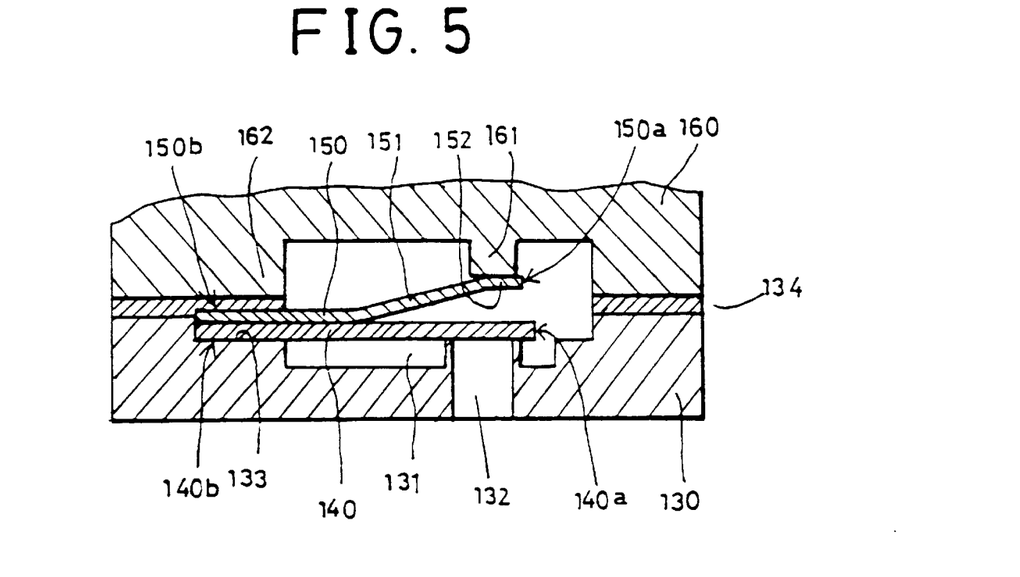
FIG. 5 is a sectional view showing a construction of a hermetic type compressor according to a first embodiment of the present invention.

The valve apparatus of the hermetic type compressor according to a first embodiment of the present invention, as shown in FIG. 5, includes a cylinder head 130 having a stepped reentrant groove 131 put on a suction valve plate (not shown) coupled to one side of a cylinder (not shown), an exhaust valve 140 and a valve spring 150 installed in the reentrant groove 131, and a head cover 160 coupled to cylinder head 130 while interposing a packing 134.

An exhaust hole 132 is formed in one side of the reentrant groove 131 of cylinder head 130 for discharging a compressed gas. A seating portion 133 for sequentially placing a fixing end 140b of exhaust valve 140 and a fixing end 150b of valve spring 150 thereon is formed to the other side of the reentrant groove 131.

The exhaust valve 140 is installed to the upper side of exhaust hole 132 for allowing a free end 140a thereof to open/close exhaust hole 132 and fixing end 140b to be fixed to seating portion 133 of the reentrant groove 131.

The valve spring 150 is disposed on the upper portion of exhaust valve 140, in which the lower surface of fixing end 150b of valve spring 150 is coupled to the upper surface of fixing end 140b of exhaust valve 140.

An upwardly-slanted portion 151 for defining the operation of the exhaust valve 140 is formed to free end 150a of the valve spring 150. Also, a horizontal portion 152 is formed to an end of upwardly-slanted portion 151 to be in contact with a supporting projection 161 of head cover 160 which will be described later.

The valve spring 150 provided as above is installed to contact exhaust valve 140 along a portion from fixing end 150b to just before starting upwardly-slanted portion 151.

A packing 134 is interposed between cylinder head 130 and head cover 160 to prevent a leakage of the compressed gas, of which one side extends to the interior of the reentrant groove 131.

In more detail, the packing 134 extends until reaching the portion of forming seating portion 133 so as to cover fixing ends 140b and 150b of exhaust valve 140 and valve spring 150 which are sequentially placed on seating portion 133 of the reentrant groove 131 with a consequence that a compressive fixing portion 162 of head cover 160 tightly presses fixing end 150b of valve spring 150 covered with packing 134 thereon.

Meantime, the head cover 160 is coupled to cylinder head 130 by interposing packing 134 on the lower surface thereof. Supporting projection 161 for defining the ascension of valve spring 150 is formed within head cover 160 to be in contact with horizontal portion 152 of valve spring 151.

Any shape may be applied as supporting projection 161 functioning as above in case of being able to define the ascension of the valve spring 150.

Compressive fixing portion 162 is formed to the inner plane of the head cover 160 for passively fixing both fixing ends 140b and 150b of exhaust valve 140 and valve spring 150 installed onto seating portion 133 of the reentrant groove 131 while interposing packing 134 when the head cover 160 is coupled to the cylinder head 130.

On the other hand, the upper surface of the valve spring 150 becomes higher than the upper surface of the cylinder head 130 when exhaust valve 140 and valve spring 150 are sequentially seated on seating portion 133 of the reentrant groove 131.

This is for firmly fixing exhaust valve 140 and valve spring 150 by tightly pressing fixing end 150b of valve spring 150 by compressive fixing portion 162 under the state of interposing packing 134 when the valve apparatus is assembled.

The above-described valve apparatus of the hermetic type compressor according to the first embodiment of the present invention is constructed such that the gas compressed within the cylinder of the compressor is discharged via exhaust hole 132 while ascending the exhaust valve 140.

At this time, the opening/closing range of the exhaust valve 140 is defined by valve spring 150 of which ascending range is limited by supporting projection 161 formed from the inner surface of head cover 160.

The exhaust valve 140 and the valve spring 150 are fixed by compressive fixing portion 162 of head cover 160 during the operating procedure of the above-described valve apparatus, so that the positions of them are not changed to ensure reliability of the valve apparatus.

In the valve apparatus of the hermetic type compressor according to the first embodiment of the present invention constructed as above, the supporting projection for defining the ascending range of the valve spring and the compressive fixing portion for fixing the exhaust valve and valve spring are integrally formed to the inner surface of the head cover in a body. Therefore, the number of elements constituting the valve apparatus is decreased to improve workability of the assembling job and reduce manufacturing cost.

Figure 6:
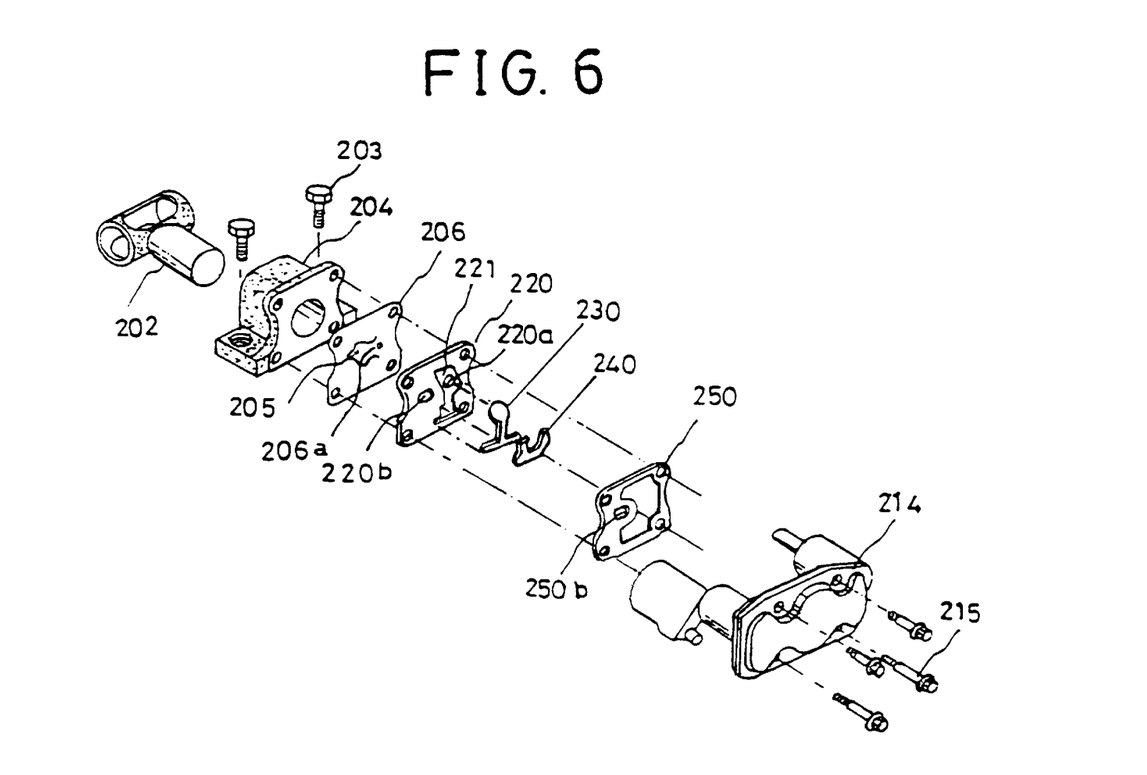
FIG. 6 is an exploded perspective view showing a construction of the valve apparatus of the hermetic type compressor according to a second embodiment of the present invention.

Meanwhile, as illustrated in FIG. 6, the valve apparatus of the hermetic type compressor according to a second embodiment of the present invention includes a cylinder head 220 joined to a suction valve plate 206 installed to a cylinder 204, and an exhaust valve 230, a fixing pin 240, a packing 250 and a head cover 214, which are sequentially stacked on cylinder head 220.

A reentrant groove 221 is formed in cylinder head 220. As shown in FIG. 7D, an exhaust hole 220a is formed in one side of the reentrant groove 221 and a fixing groove portion 224 is formed to other side of the reentrant groove 221.

The fixing groove portion 224 has an elongated leg seating section 225 for seating fixing legs 232 and 232' of exhaust valve 230 to be described later and a rectangular fixing-pin settling section 226 for settling fixing pin 240.

A suction hole 220b which is opened and closed by suction valve 205 of suction valve plate 206 is formed in one side of cylinder head 220.

Figure 7A:
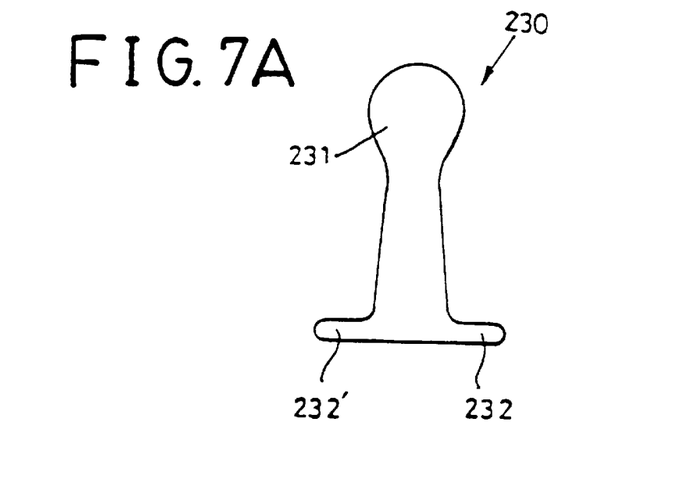
FIG. 7A is a plan view showing the exhaust valve being an element of the valve apparatus used for the second embodiment of the present invention.

As illustrated in FIG. 7A, legs 232 and 232' seated on leg seating section 225 of the reentrant groove 221 opposingly extend at one end of exhaust valve 230, and a valve opening/closing portion 232 of a predetermined shape is formed to other end of exhaust valve 230 for opening/closing exhaust hole 220a.

The exhaust valve 230 formed as above is installed in such a manner that valve opening/closing portion 231 is seated in exhaust hole 220a formed in the reentrant groove 221 and legs 232 and 232' are seated in leg seating section 225.

Figure 7B:
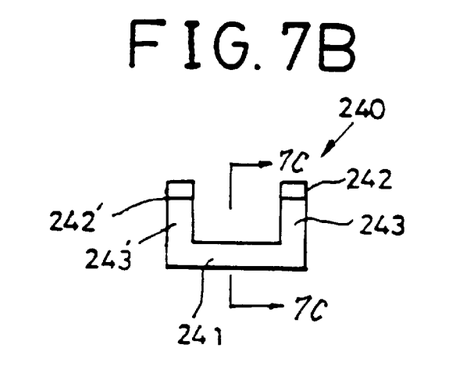
FIG. 7B is a plan view showing a structure of the fixing pin being an element of the valve apparatus used for the second embodiment of the present invention.
Figure 7C:
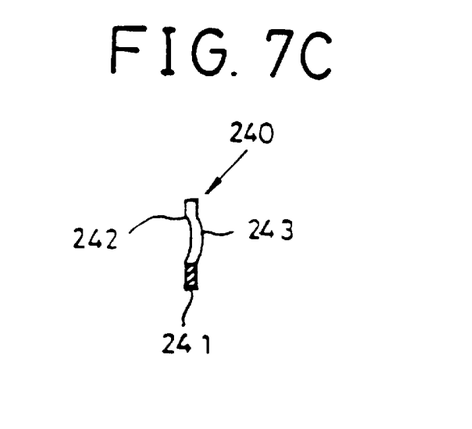
FIG. 7C is a sectional view showing the structure of the fixing pin being an element of the valve apparatus used for the second embodiment of the present invention.
Figure 7D:
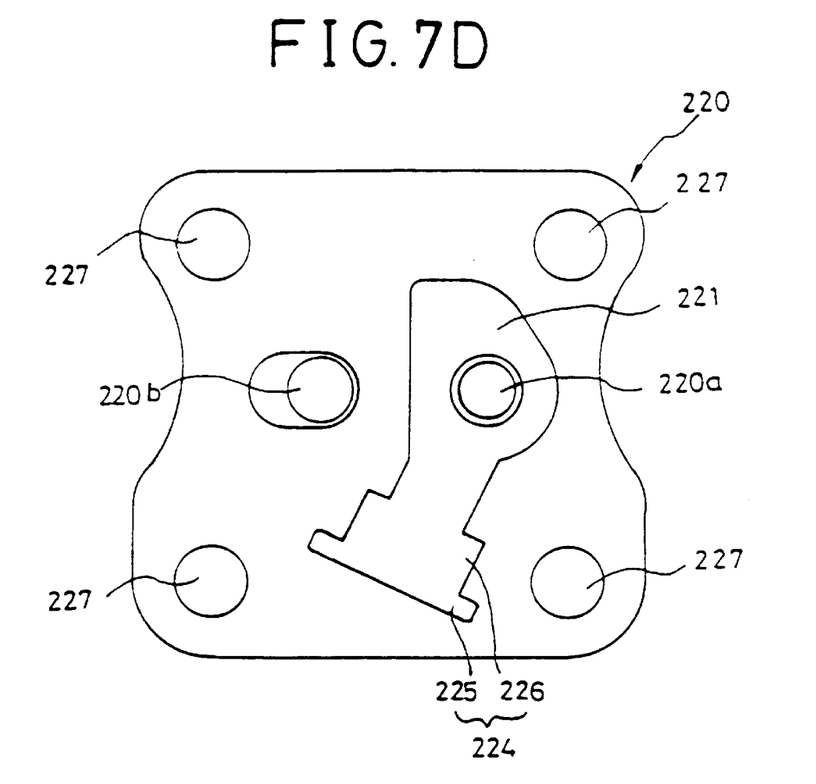
FIG. 7D is a plan view showing a structure of the cylinder head being an element of the valve apparatus used for the second embodiment of the present invention.

As shown in FIGS. 7B and 7C, fixing pin 240 includes a fixing-pin body 241, and fixing arms 242 and 242' formed in parallel with each other in the same direction on both ends of body 241.

Figure 8:
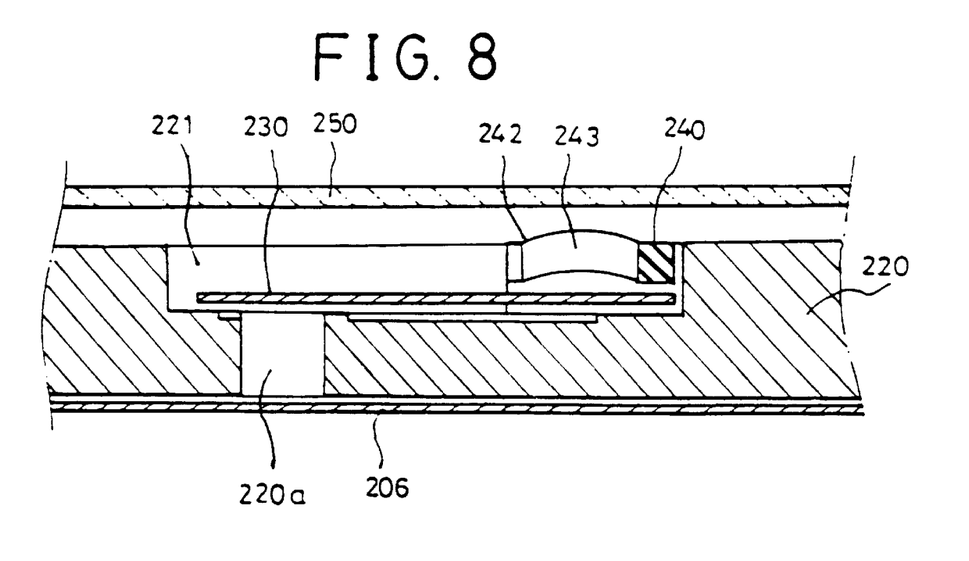
FIG. 8 is a sectional view showing the assembled structure of the valve apparatus according to the second embodiment of the present invention.

Arch elastic-bent portions 243 and 243' are formed in the center of fixing arms 242 and 242'. Thus, as shown in FIG. 8, when the valve apparatus is assembled, fixing arms 242 and 242' are assembled to be higher than the surface of cylinder head 220 to permit head cover 214 to press arch elastic-bent portions 243 and 243', thereby enabling to fix exhaust valve 230.

Fixing arms 242 and 242' are inserted in sidewalls of fixing-pin settling section 226 formed to the reentrant groove 221 to be fixed thereto. By this construction, body 241 of fixing pin 240 is placed on fixing legs 232 and 232' of exhaust valve 230 to fix exhaust valve 230.

Undefined reference numeral 227 denotes screw holes for insertedly fixing screws 215, and 250b is a suction hole perforating through packing 250.

The valve apparatus of the hermetic type compressor according to the second embodiment of the present invention constructed as above is assembled such that fixing pin 240 is used to fixedly install exhaust valve 230 to the reentrant groove 221 of cylinder head 220 which is coupled to suction valve plate 206 installed to one side of cylinder 204, and head cover 214 is joined thereto by interposing packing 250.

More specifically, legs 242 and 242' of exhaust valve 230 are seated to leg seating section 225 of fixing groove portion 224 provided to one side of the reentrant groove 221 of cylinder head 220, and body 241 of fixing pin 240 is disposed on legs 242 and 242' to insert fixing arms 242 and 242' to fixing-pin settling section 226, thereby fixing exhaust valve 230.

Under the aforementioned state, head cover 214 is assembled to be joined into cylinder head 220 by interposing packing 250 on cylinder head 220.

Here, arch elastic-bent portions 243 and 243' of fixing pin 240 are pressed by head cover 214 to compress exhaust valve 230, so that exhaust valve 230 is firmly fixed to the reentrant groove 221.

Figure 9:
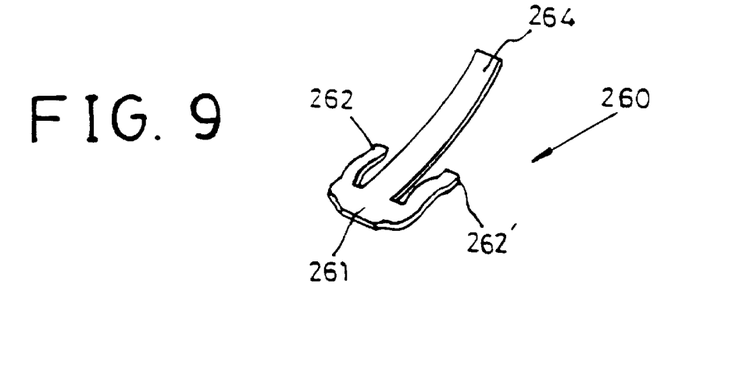
FIG. 9 is a perspective view showing the integrally-formed fixing pin and valve spring in a body used for the valve apparatus according to a third embodiment of the present invention.

FIG. 9 illustrates the valve apparatus according to a third embodiment of the present invention, in which a valve spring 264 is integrally formed with a fixing pin 260 which is shaped as fixing pin 240 of the second embodiment of the present invention to simultaneously serve for fixing exhaust valve 230 and defining the ascension of exhaust valve 230.

Fixing pin 260 employed in the third embodiment of the present invention has fixing arms 262 and 262' extending in the same direction on both ends of a body 261, and a valve spring 264 which extends in the same direction of fixing arms 262 and 262' in the center of body 261 of fixing pin 260 and is upward slanted as being closer to a free end thereof.

A method of fixing exhaust valve 230 by using fixing pin 260 integrally formed with valve spring 264 is the same as that of using fixing pin 240 of the valve apparatus of the second embodiment of the present invention, which thus will be omitted.

In the valve apparatus according to the second and third embodiments of the present invention constructed as above, the reentrant groove is formed in the cylinder head and the exhaust hole is formed within the reentrant groove. Therefore, the dead volume is reduced to enhance efficiency of the compressor. Also, the fixing pin of the simple structure is adopted to securely fix the exhaust valve installed within the reentrant groove.

Figure 10:
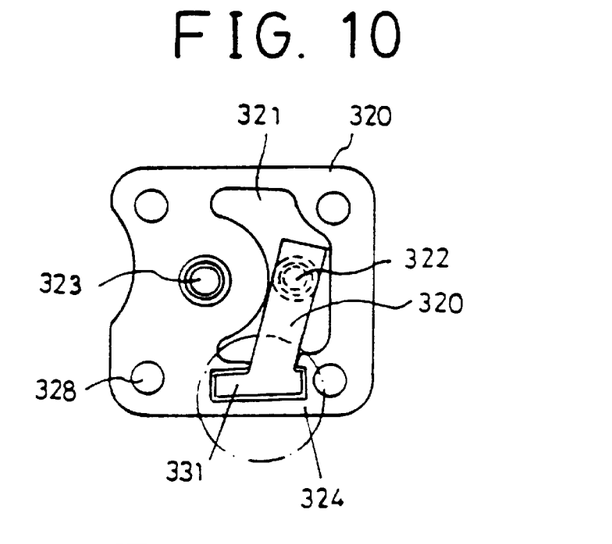
FIG. 10 is a plan view showing a state that the exhaust valve is placed on the cylinder head of the valve apparatus according to a fourth embodiment of the present invention.

Referring to FIG. 10, the valve apparatus of the hermetic type compressor according to a fourth embodiment of the present invention includes a cylinder head 320 installed to a suction valve plate (not shown) joined to a cylinder (not shown), an exhaust valve 330, a valve spring 335 and a fixing member 340 installed within a reentrant groove 321 of cylinder head 320.

Fixing grooves 325 and 325' and a seating portion 324 are formed to one side of the reentrant groove 321 of cylinder head 320.

Exhaust valve 330, valve spring 335 and fixing member 340 are sequentially stacked onto the the reentrant groove 321 of cylinder head 320.

A valve fixing plate 331 seated on seating portion 324 is integrally formed to one end of exhaust valve 330 for opening/closing exhaust hole 322 formed within the reentrant groove 321.

The valve spring 335 is in contact with the upper surface of exhaust valve 330 for defining the ascension of exhaust valve 330, of which one end is integrally formed with a spring fixing plate 336 corresponding to valve fixing plate 331 installed to the seating portion 324.

Consequently, spring fixing plate 336 becomes disposed on the upper portion of valve fixing plate 331 of exhaust valve 330 when valve spring 335 is installed to the upper portion of exhaust valve 330 within the reentrant groove 321.

The fixing member 340 which functions for pressing to fix spring fixing plate 336 placed on valve fixing plate 331 includes a compressive portion 342 depressed in the center thereof for pressing to fix the spring fixing plate 336 and elastic portions 341 and 341' bent at both sides of compressive portion 342 to be inserted to the fixing grooves 325 and 325'.

Distal ends of the elastic portions 341 and 341' downwardly extend to be longer than the compressive portion 342 so as to be inserted to fixing grooves 325 and 325' when the valve apparatus is completely assembled.

Undefined reference numeral 323 denotes a suction hole, and 328 is a screw hole for fixedly receiving a screw for coupling the valve apparatus.

The valve apparatus of the hermetic type compressor according to the fourth embodiment of the present invention constructed as above is assembled in the following order.

First, one end of exhaust valve 330 is seated onto the reentrant groove 321 of the cylinder head 320, and fixing plate 331 of exhaust valve 330 is seated onto the seating portion 324.

Figure 11A:
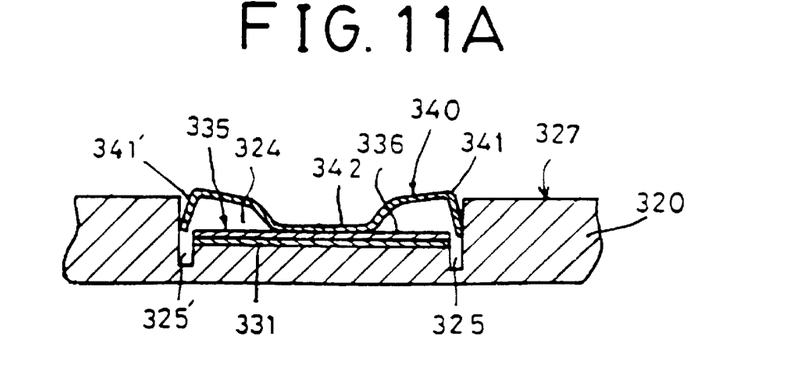
FIG. 11A is a sectional view showing a structure of the valve apparatus according to the fourth embodiment of the present invention under being provisionally assembled.

Successively, under the state of seating valve spring 335 on the upper portion of exhaust valve 330, the lower surface of compressive portion 342 of fixing member 340 is in contact with the upper surfaces of valve fixing plate 331 of exhaust valve 330 and spring fixing plate 336 of valve spring 335, which are sequentially disposed to seating portion 324, and fixing legs 341 and 341' are inserted to both end walls of seating portion 324 by means of elasticity, thereby provisionally fixing them as shown in FIG. 11A.

Then, under the state of the provisional assembly, packing 351 and head cover 350 are sequentially stacked on cylinder head plane 327 to be coupled therewith.

Figure 11B:
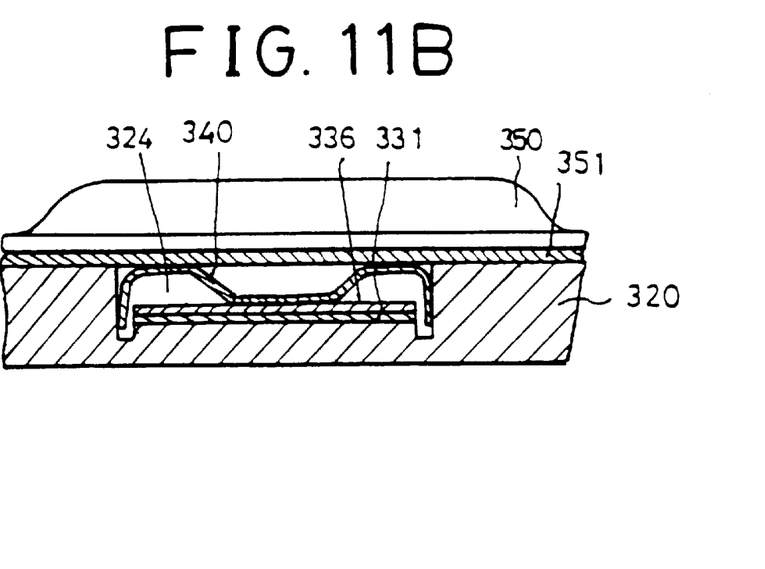
FIG. 11B is a sectional view showing the structure of the valve apparatus according to the fourth embodiment of the present invention under being completely assembled.

At this time, in the provisional assembly state, the upper surfaces of elastic members 341 and 341' are higher than cylinder head plane 327. However, once packing 351 is joined with head cover 350 to complete the assembly as shown in FIG. 11B, elastic portions 341 and 341' of fixing member 340 are inserted to fixing grooves 325 and 325' formed in both ends of seating portion 324 to let exhaust valve 330 be completely fixed with valve spring 335.

In the valve apparatus according to the fourth embodiment of the present invention constructed as above, the exhaust valve and valve spring can be assembled while being provisionally assembled by means of the fixing member. Also, when being completely assembled, the exhaust valve and valve spring are tightly pressed to be fixed by means of the fixing member. Thus, the valve apparatus can be operated while the exhaust valve and valve spring are installed in the accurate location without changing the positions of them.

Figure 12:
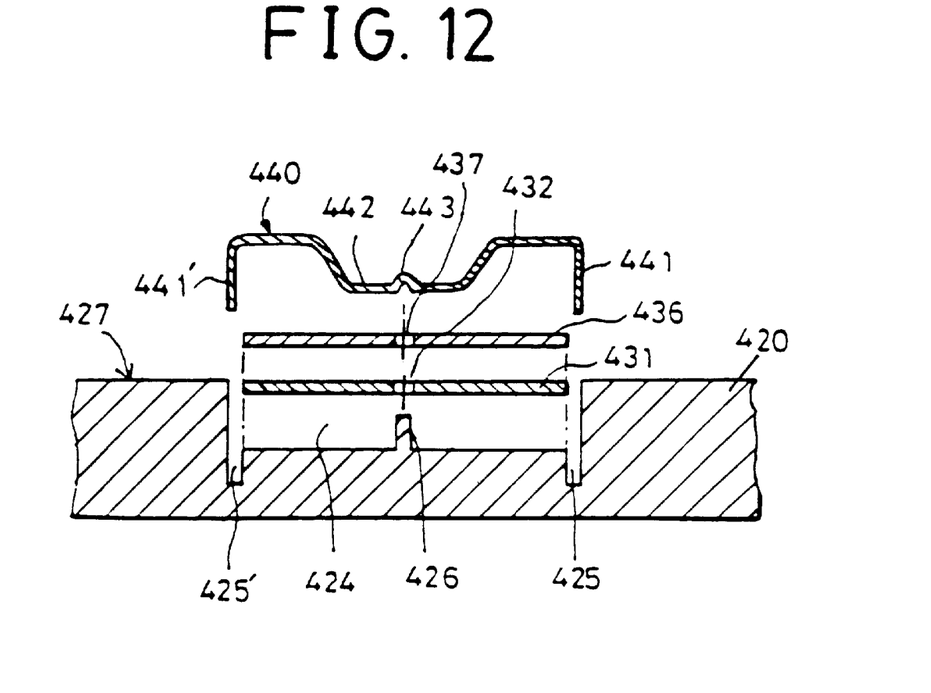
FIG. 12 is an exploded sectional view showing the valve apparatus according to a fifth embodiment of the present invention.

FIG. 12 illustrates the valve apparatus of the hermetic type compressor according to a fifth embodiment of the present invention.

As compared with the fourth embodiment, the fifth embodiment of the present invention further has a fixing projection 426 protruding from seating portion 424 and fixing apertures 432 and 437 being position-fixing elements which respectively perforate through a spring fixing plate 436 of a valve spring 435 corresponding to fixing projection 426. Additionally, an embossing 443 which is a fixing element is provided on a compressive portion 442 of a fixing member 440.

Even though not being separately shown as a drawing, a sixth embodiment of the present invention has an embossing being the position-fixing element corresponding to the fixing projection of the seating portion, which is formed to the valve fixing plate, spring fixing plate of the valve spring and compressive portion of the fixing member.

Since the valve apparatus of the hermetic type compressor according to the fourth to sixth embodiments of the present invention is comprised of the elements having the simple structure, the position of the exhaust valve or valve spring is not changed during the operation thereof to maximize the efficiency of the compressor while reducing the consumption power of a product which utilizes the compressor.

Figure 13:
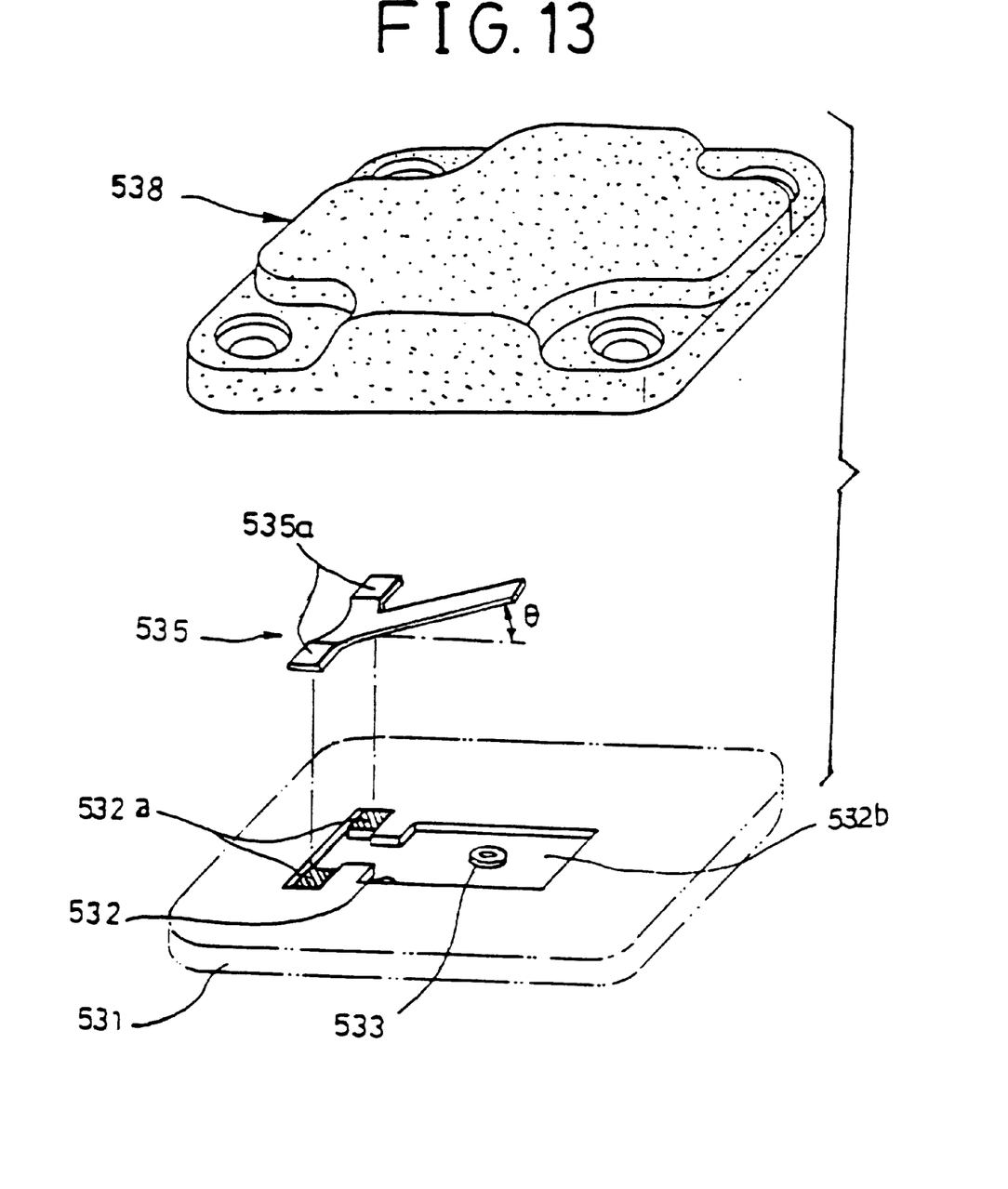
FIG. 13 is an exploded perspective view showing the construction of the valve apparatus according to a sixth embodiment of the present invention.

Referring to FIG. 13 which illustrates the valve apparatus of the hermetic type compressor according to a seventh embodiment of the present invention, a reentrant groove 532 is formed around the center of a cylinder head 531, and an exhaust hole 533 is formed in the center portion of the reentrant groove 532.

Figure 14:
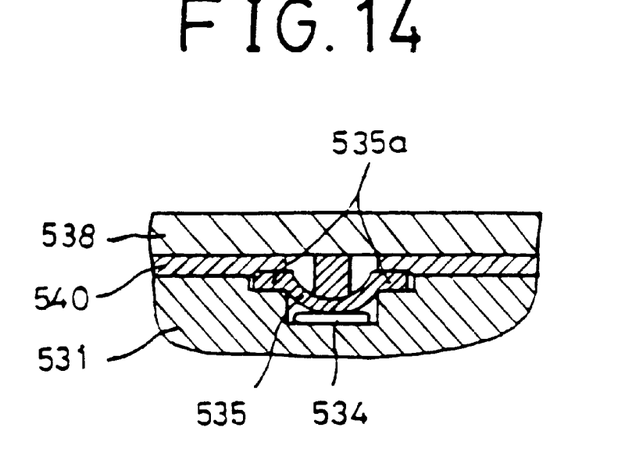
FIG. 14 is a sectional view of the valve apparatus shown in FIG. 13.

An exhaust valve 534 is installed to the upper side of exhaust hole 533, and, as shown in FIG. 14, a valve spring 535 for constantly defining an opening position of exhaust valve 534 and closing exhaust valve 534 by means of the elasticity is installed to the upper surface of exhaust valve 534.

A wing portion 535a is formed to both sides of one end of valve spring 535, and the other end of valve spring 535 is upwardly slanted to have a predetermined inclination angle Θ for applying prescribed elasticity upon exhaust valve 534 when exhaust valve 534 is initially opened regardless of a lack of the force upon valve spring 535.

The reentrant groove 532 is provided with a first seating portion 532a for seating valve spring 535 and a second seating portion 532b having the same height as exhaust hole 533 for seating exhaust valve 534.

By this construction, when wing portion 535a of valve spring 535 is seated to first seating portion 532a prior to assembling head cover 538, valve spring 535 is fixedly supported by head cover 538.

When packing 540 for preventing the leakage of the refrigerant gas is placed on the upper surface of wing portion 535a of valve spring 535 to assemble cylinder head 531 with head cover 538, packing 540 is tightly pressed by head cover 538 and in turn apply a force upon valve spring 535 to afford an airtight effect as well as fixedly support valve spring 535 and one side of exhaust valve 534.

In the valve apparatus according to the seventh embodiment of the present invention constructed as above, wing portion 535a of valve spring 535 is seated on first seating portion 532a formed to the reentrant groove 532 of cylinder head 531, to position valve spring 535 onto cylinder head 531, and packing 540 is seated thereon. Thereafter, head cover 538 is coupled with cylinder head 531 to be assembled.

Here, since first seating portion 532a formed to the reentrant groove 532 protrudes over second seating portion 532b which is the other bottom of the reentrant groove 532, exhaust valve 534 can be firmly fixed with valve spring 535 by means of the tight pressurizing force of head cover 538 when head cover 538 is joined with cylinder head 531 while interposing packing 540.

In the valve apparatus of the hermetic type compressor according to the above-described seventh embodiment of the present invention, the exhaust valve and valve spring are firmly fixed to each other to prevent the backward flow of the refrigerant and decrease the space of dead volume.

Moreover, the body portion of the valve spring is upwardly slanted by involving the predetermined inclination angle, so that the force imposed upon the valve spring is decreased when the exhaust valve is initially open. Consequently, the elasticity restoring force of the valve spring can be continuously maintained for a long time period to accurately attain the opening/closing operation of the exhaust valve.

Figure 15:
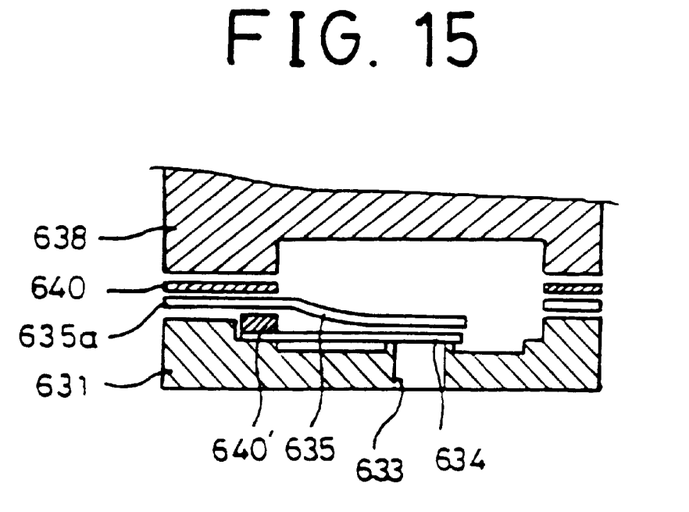
FIG. 15 is a sectional view showing the valve apparatus according to a seventh embodiment of the present invention.

An eighth embodiment of the present invention is characterized in that, as shown in FIG. 15, a packing 640' is interposed between a valve spring 635 and an exhaust valve 634 in addition to the structure of the seventh embodiment.

In the above-mentioned eighth embodiment of the present invention, the space between valve spring 635 and exhaust valve 634 is enlarged due to the interposition of packing 640'. For this reason, it is preferable to downwardly slant valve spring 635 for permitting valve spring 635 to serve effectively.

As described above, the valve apparatus of the hermetic type compressor according to the present invention can decrease the dead volume to heighten the efficiency of the compressor. Also, the number of elements constituting the valve apparatus is reduced to enhance the workability of the assembling operation and economize the manufacturing cost.

Furthermore, the valve apparatus of the hermetic type compressor according to the present invention can firmly fix the exhaust valve and valve spring to the accurate location. Thus, the position of the exhaust valve or valve spring is not changed during the operation of the valve apparatus to enhance the efficiency of the compressor and reduce the power consumption of the product which adopts the compressor.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A valve apparatus of a hermetically sealed compressor comprising:

a cylinder head provided with a reentrant groove having an exhaust hole for ejecting a compressed refrigerant from an interior of a cylinder, a fixing groove part including a leg seating portion and a fixing-pin setting portion and a seating portion, respectively;

a single exhaust valve installed at an upper surface of said exhaust hole, the exhaust hole being openable and closeable by said exhaust valve, said exhaust valve having legs at one end thereof which extend in opposing directions and having another end which selectively engages the upper surface of said exhaust hole, said legs of said exhaust valve being seated on said leg seating portion of said reentrant groove and said another end of said exhaust valve being placed on the upper surface of said exhaust hole of said reentrant groove;

a one-piece fixing pin having a fixing-pin body and fixing arms extending from opposite ends of said fixing-pin body, said fixing arms of said fixing pin being fixed by being inserted in sidewalls of said fixing-pin setting portion of said reentrant groove, free ends of said fixing arms engaging said fixing pin setting portion and said fixing-pin body engaging with and pressing on said legs of said exhaust valve to fix said exhaust valve in place;

a head cover;

a packing engaging said cylinder head and head cover and interposed therebetween for preventing leakage of said refrigerant gas, said packing covers a portion of said fixing pin;

an arch elastic-bent portion protruding from a center portion of each fixing arm of said fixing pin, said arch portions engaging said cylinder head; and a valve spring integrally formed with said fixing pin, the valve spring extending from an upper center portion of said fixing-pin body between said fixing arms and having an upward inclination extending in the same direction as said fixing arms.

* * * * *